UNITED STATES PATENT OFFICE.

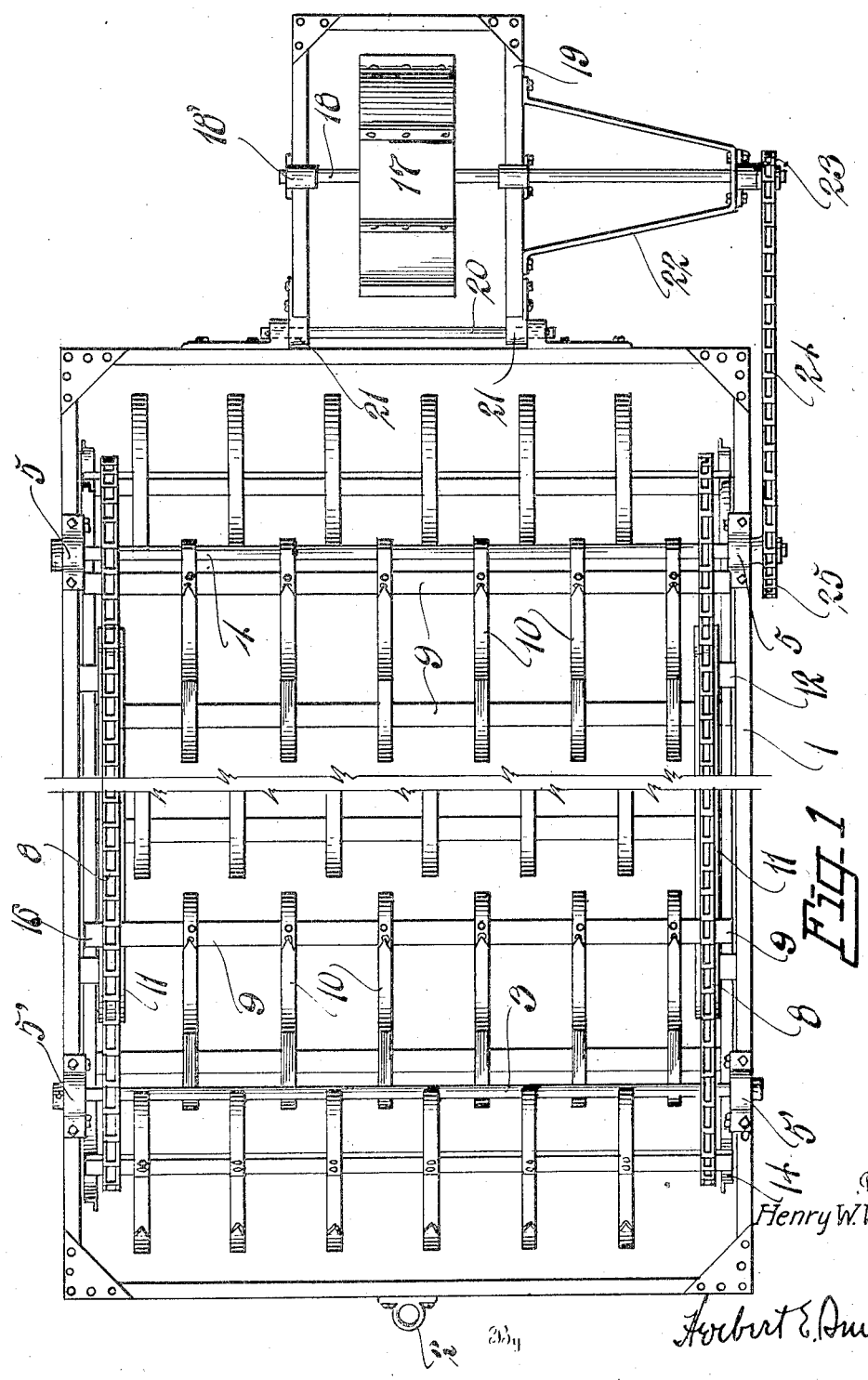

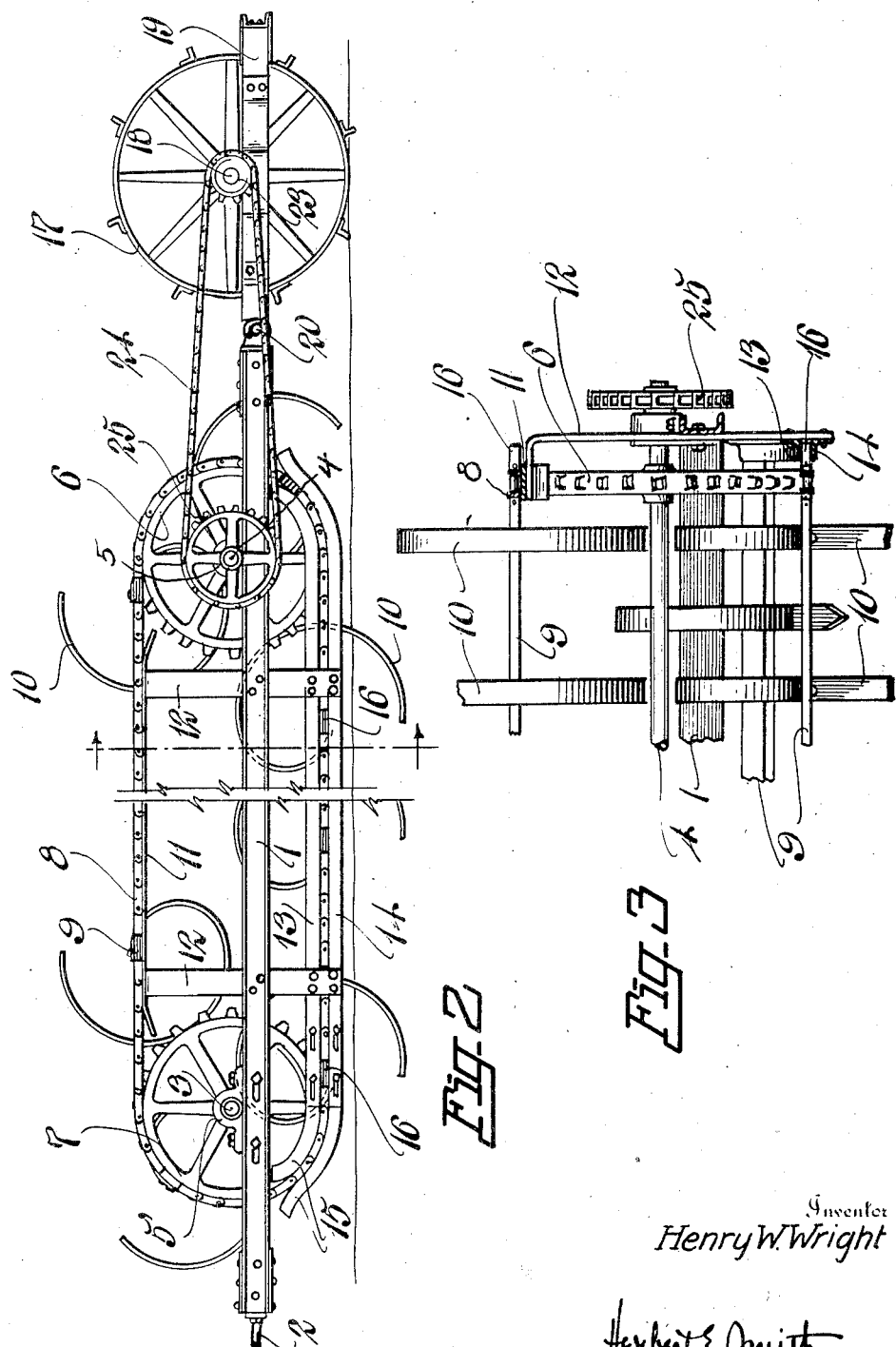

HENRY W. WRIGHT, OF SPOKANE, WASHINGTON, ASSIGNOR OF ONE-HALF TO
PETER A. BRIGGS, OF SPOKANE, WASHINGTON.

SELF-CLEANING HARROW.

1,359,560. Specification of Letters Patent. Patented Nov. 23, 1920.

Application filed January 24, 1920. Serial No. 353,699.

*To all whom it may concern:*

Be it known that I, HENRY W. WRIGHT, a citizen of the United States, residing at Spokane, in the county of Spokane and State of Washington, have invented certain new and useful Improvements in Self-Cleaning Harrows, of which the following is a specification.

My present invention relates to improvements in self cleaning harrows and is designed particularly for the purpose of providing an agricultural implement or cultivator having means whereby the teeth of the harrow are constantly cleaned while in use, to prevent the accumulation of weeds, grass, &c., on the tines or teeth of the harrow, and by this constant and automatic cleaning of the tines considerable time is saved and the work of the tines is more effective.

To accomplish this purpose I provide a carrier for the harrow teeth supported on the harrow frame, and also equip the implement with means actuated by the movement of the implement as it is drawn over the surface of the ground, for moving the carrier and tines while in operative position in reverse direction to the movement of the implement in order that the tines may be carried to inoperative position and inverted for the purpose of dropping or being freed from weeds or grass that may have been picked up as the tines pass through the soil.

The invention consists essentially in certain novel combinations and arrangements with an endless carrier moved from a traction wheel revolved by the forward movement of the implement through the instrumentality of which the tines on the lower flight of the endless carrier as they pass through the soil, are continuously moved to the rear of the implement, and while passing over the upper flight of the carrier these tines are inverted so that the accumulated weeds, &c., are dropped from the tines, and the invention further consists in certain other details of construction as will be set forth in the specification and claim.

In the accompanying drawings I have illustrated one complete example of the physical embodiment of my invention in which the parts are constructed and combined according to the best mode I have so far devised for the practical application of the principles of my invention.

Figure 1 is a plan view of an implement embodying the present invention.

Fig. 2 is a side view of the implement, partly broken away, as in Fig. 1, for purposes of illustration.

Fig. 3 is an enlarged, detail sectional view showing a driving sprocket of the endless carrier and its connections.

In the preferred form of my invention as illustrated in the drawings I utilize the main frame 1 which is of rectangular form and preferably made up of channel irons and angle plates securely riveted or bolted together to provide a support for the operative parts of the implement, and at 2 the draft appliance as a power tractor may be applied, or horse power may be attached at this point to draw the implement over the surface of the soil in usual manner.

At the respective rear and front ends of the frame are supported and journaled the transverse shafts 4 and 3 having bearings 5 and adjustable bearings 5' the latter for the purpose of adjusting the endless carrier to adapt it for most advantageous working position. The respective shafts 4 and 3 have secured thereon pairs of sprocket wheels 6 and 7, the former the driving wheels of the carrier and the latter the driven wheels thereof. The carrier is made up of a pair of parallel, spaced chains 8, 8, joined at regularly spaced intervals by the cross bars or slats 9, secured near their ends to the respective chains, and the carrier is adapted to travel as to its upper flight in the direction of movement of the harrow and as to its lower flight in the reverse direction thereof.

Upon the transverse bars 9 are secured the spring tines or teeth 10 of the harrow, curved in the manner shown in Fig. 2, and arranged in staggered relation as shown in the plan view Fig. 1, with their points positioned toward the front when the tines are in operative relationship on the lower flight of the endless carrier, as in Fig. 2, and the points are adapted to enter and pass through the soil at the surface of the ground in usual manner for this type of harrow tooth.

To insure stability of the carrier and uniformity of travel of the teeth of the harrow, an upper longitudinally extending guide rail 11 is provided above the main frame over which the chains pass, one of these rails being located at each side of the frame, and supported on the vertical posts 12 secured to the frame and extending above and below the frame as shown in Fig. 2. At the lower ends of these posts are supported the longitudinal guide bars 13 and 14, a pair at each side of the frame, to form grooves between them for the passage of the chains. These lower guide rails are preferably made up of angle bars, as shown in Fig. 3, and spaced apart, with their parallel ends turned up at 15 a suitable distance around the wheels 6 and 7, and between the bars the ends 16 of the transverse bars, beyond the chains, pass and are guided. In this manner the transverse bars are held stable as supports for the harrow teeth as they pass through the ground or soil, and the carrier is prevented from becoming disarranged or dislocated, while the harrow is performing its functions.

The carrier is designed and so related to the implement, as to traverse the length of the frame, in order that the lower flight of the carrier may slowly move in reverse direction to the forward movement of the harrow, thus bodily moving the carrier and retarding the forward movement of the harrow teeth on the transverse bars of the carrier when their teeth are in operative position. The movement to the rear of the teeth on the lower flight is comparatively slower than the forward movement of the harrow, and the movement of the carrier may be varied by varying the size of the sprocket wheels, to adapt the harrow teeth to differing conditions met with in passing through the soil.

To accomplish the movement of the carrier I utilize a traction wheel 17, at the rear of the implement, and fixed on the axle or shaft 18 that is journaled in the bearings 18' of the hinged frame 19. This wheel frame or extension is rectangular in form and hinged on the tail bar 20 by bearings 21 of the frame, in order that the frame and wheel may have a flexible connection to the harrow frame to adapt the wheel to any irregularities in the surface of the soil. The tail bar is attached to the frame as shown in Fig. 2, and a side bracket or frame 22 is carried by the wheel frame to support the elongated shaft or axle 18 which has at its outer end a small driving sprocket 23, and is connected by sprocket chain 24 to the larger driven sprocket wheel 25 on the shaft 5 of the carrier. It will now readily be seen that the endless carrier is actuated through the above described chain connections from the traction wheel 17 traveling at the rear of the harrow or implement.

In actual practice it is a well known fact that the teeth of the well known drag type of harrow gather trash, weeds, mustard, &c., which impairs the efficiency of the harrow and consumes time and labor in the removal of these accumulations. By the utilization of my invention in the implement, the working teeth are constantly changing and passing out of operative relationship to the harrow, and as the transverse bars with their tines pass upwardly at the rear of the carrier and over the driving wheels of the carrier, the teeth are inverted and the accumulated trash is dropped therefrom, thus cleaning the teeth as they pass along the upper flight of the carrier and bringing them in to operative position free of all impediment and ready to perform their functions in an efficient manner.

Colorable changes may be made and are contemplated in the exemplified structure shown in the drawings, without departing from the spirit of my invention as set forth in the following claim.

What I claim is—

In a self cleaning harrow the combination with the main frame, of an endless carrier and harrow teeth thereon, a rear frame flexibly connected to the main frame and a traction wheel journaled in the flexible frame, and operative connections between said traction wheel and endless carrier whereby the lower flight of the carrier is continuously moved toward the rear of the harrow at a slower surface speed than the forward speed of the harrow.

In testimony whereof I affix my signature.

H. W. WRIGHT.